United States Patent
Mizutani et al.

(10) Patent No.: US 8,675,959 B2
(45) Date of Patent: Mar. 18, 2014

(54) COMPUTER-READABLE RECORDING MEDIUM AND IMAGE PROCESSING APPARATUS

(71) Applicant: Fujitsu Limited, Kawasaki (JP)

(72) Inventors: Masami Mizutani, Kawasaki (JP); Seiya Shimizu, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/718,087

(22) Filed: Dec. 18, 2012

(65) Prior Publication Data

US 2013/0108155 A1 May 2, 2013

Related U.S. Application Data

(63) Continuation of application No. PCT/JP2010/061205, filed on Jun. 30, 2010.

(51) Int. Cl.
    G06K 9/00       (2006.01)
(52) U.S. Cl.
    USPC .................... 382/165; 382/151; 382/181
(58) Field of Classification Search
    None
    See application file for complete search history.

(56) References Cited

U.S. PATENT DOCUMENTS

| | | | | |
|---|---|---|---|---|
| 5,444,799 A * | 8/1995 | Hirono et al. | ................. | 382/287 |
| 6,768,509 B1 * | 7/2004 | Bradski et al. | ........... | 348/207.99 |
| 7,847,939 B2 * | 12/2010 | Smith et al. | ..................... | 356/401 |
| 8,106,968 B1 * | 1/2012 | Rudin et al. | .................. | 348/241 |
| 8,401,295 B2 * | 3/2013 | Shiba | ............................ | 382/181 |
| 2001/0012985 A1 * | 8/2001 | Okamoto et al. | ............... | 702/94 |
| 2004/0234122 A1 * | 11/2004 | Kochi et al. | .................... | 382/154 |
| 2004/0258314 A1 * | 12/2004 | Hashimoto | .................... | 382/224 |
| 2007/0139321 A1 * | 6/2007 | Takemoto et al. | ............... | 345/87 |
| 2008/0002041 A1 * | 1/2008 | Chuang et al. | ................ | 348/241 |
| 2008/0181488 A1 * | 7/2008 | Ishii et al. | ..................... | 382/154 |
| 2008/0240612 A1 * | 10/2008 | Liang et al. | .................... | 382/284 |
| 2009/0022369 A1 * | 1/2009 | Satoh et al. | .................... | 382/106 |

(Continued)

FOREIGN PATENT DOCUMENTS

| | | |
|---|---|---|
| JP | 2001-285681 | 10/2001 |
| JP | 2007-164631 | 6/2007 |

(Continued)

OTHER PUBLICATIONS

Mingqiang et al. "A survey of shape feature extraction techniques" 2008.*

(Continued)

*Primary Examiner* — Vu Le
*Assistant Examiner* — Alexander J Lesnick
(74) *Attorney, Agent, or Firm* — Staas & Halsey LLP

(57) ABSTRACT

A computer-readable recording medium has stored therein an image processing program for causing a computer to execute a process including identifying, on a taken image of a jig having a plurality of first color regions and a plurality of second color regions different in color from the first color regions, the first color regions, comparing each of the identified first color regions with a predetermined convex shape and retracting each of the first color regions until it is determined that each of the first color regions has a similarity in shape to the predetermined convex shape, and determining a feature point of the jig on the image on the basis of a positional relationship of a plurality of first retracted regions on the image, the first retracted regions being obtained from the first color regions as a result of retraction at the retracting.

8 Claims, 12 Drawing Sheets

(56) References Cited

U.S. PATENT DOCUMENTS

| | | | |
|---|---|---|---|
| 2009/0180008 A1* | 7/2009 | Williams et al. | 348/241 |
| 2010/0067072 A1* | 3/2010 | Lefevere | 358/504 |
| 2010/0134516 A1* | 6/2010 | Cooper | 345/592 |
| 2010/0245541 A1* | 9/2010 | Zhao et al. | 348/45 |
| 2010/0245594 A1* | 9/2010 | Tobie et al. | 348/188 |
| 2010/0302366 A1* | 12/2010 | Zhao et al. | 348/142 |
| 2011/0063417 A1* | 3/2011 | Peters, II et al. | 348/47 |
| 2011/0157373 A1* | 6/2011 | Ye et al. | 348/187 |
| 2011/0182477 A1* | 7/2011 | Tamrakar et al. | 382/110 |
| 2012/0121127 A1* | 5/2012 | Aoki et al. | 382/103 |
| 2012/0133779 A1* | 5/2012 | Ma et al. | 348/175 |
| 2012/0287287 A1* | 11/2012 | Grossmann et al. | 348/181 |
| 2013/0033596 A1* | 2/2013 | Crothers et al. | 348/135 |

FOREIGN PATENT DOCUMENTS

| | | |
|---|---|---|
| JP | 2008-131250 | 6/2008 |
| JP | 2008-187564 | 8/2008 |
| JP | 2009-146150 | 7/2009 |
| JP | 2010-87743 | 4/2010 |

OTHER PUBLICATIONS

Rufli et al. "Automatic Detection of Checkerboards on Blurred and Distorted Images" 2008.*

Sun et al. "Robust Checkerboard Recognition for Efficient Nonplanar Geometry Registration in Projector-camera Systems" 2008.*

Dao et al. "A Robust Recognition Technique for Dense Checkerboard Patterns," Aug. 26, 2010.*

Dao et al. "A Robust Recognition Technique for Dense Checkerboard Patterns" 2010.*

International Search Report of Corresponding PCT Application PCT/JP2010/061205 mailed Sep. 7, 2010.

* cited by examiner

COMPUTER-READABLE RECORDING MEDIUM AND IMAGE PROCESSING APPARATUS

CROSS-REFERENCE TO RELATED APPLICATION

This application is a continuation of International Application No. PCT/JP2010/061205, filed on Jun. 30, 2010 and designating the U.S., the entire contents of which are incorporated herein by reference.

FIELD

The embodiments discussed herein are directed to a technology to extract coordinates of a jig on a camera image used in a camera calibration process for calculating the position and posture of a camera.

BACKGROUND

There has been proposed a technology to acquire an image of the surroundings of a vehicle with a camera to show a driver of the vehicle the acquired image for the purpose of making the driver easily check the surroundings of the vehicle and drive safely. For example, if multiple cameras are mounted on the periphery of a vehicle, and respective images acquired by the cameras are synthesized, a driver can visually recognize an image of a wider range of surrounding area of the vehicle.

To acquire a synthetic image that does not give the driver a feeling of strangeness, i.e., a synthetic image in which any joint between images is not misaligned or any images are not skewed as a result of the synthesis of camera images, it is preferable to install the cameras in the predetermined positions and directions. However, as the cameras are mounted on the vehicle, the installation position and angle of the camera may change due to slackness of the mounted part or vibrations caused by running the vehicle, etc. Therefore, it is preferable to check if there is any misalignment of the mounting positions and angles of the cameras and perform a calibration process to calibrate the installation positions and angles of the cameras before shipment of the vehicle, at the safety inspection of the vehicle, and at the arbitrary timing after the vehicle is put into use.

In the calibration process to calibrate the installation positions and angles of the cameras, an image of a marker (a jig) placed in a prescribed position within a shooting range of the camera is taken, and the position of the marker on the taken image, i.e., coordinates of a feature point of the marker on the image is used. As for the marker used in the calibration process, it is preferable that the marker has a pattern of which the feature point can be easily extracted on a camera image; for example, a checkered-patterned marker is conceivable. In the checkered-patterned marker, the center point of the checkered pattern, for example, can be a feature point.

Conventional technologies of extracting a feature point of a checkered-patterned marker include, for example, a technology to detect border lines between different color regions in the checkered pattern on an image and find a point of intersection between the detected lines, thereby extracting a feature point of the marker.

Patent document 1: Japanese Laid-open Patent Publication No. 2010-087743
Patent document 2: Japanese Laid-open Patent Publication No. 2008-131250

Incidentally, coordinates of a feature point of a marker on an image is used as a parameter of the above-described calibration process. Thus, if the accuracy of extraction of a feature point from a marker on a camera image is low, the accuracy of the calibration process to calibrate the installation positions and angles of cameras is also low. Therefore, it is important to accurately extract a feature point of a marker on a camera image.

For example, as for cameras mounted on a vehicle to take an image of the surroundings of the vehicle, it is preferable to cover the surroundings of the vehicle with as few cameras as possible; therefore, for example, a wide angle camera is often used. The shape of an object seen on an image taken with the wide angle camera tends to gradually become unclear, for example, gradually become smaller or distorted, etc. with distance from the center of the image plane.

When the above-described calibration process is performed, a prescribed position at which a marker is placed can be within an area where shooting ranges of two cameras are overlapped; however, when viewed through each of the cameras, the area is located near the edge of the image plane. Thus, because of the characteristics of the wide angle camera, an image of the marker is unclear, for example, an image of the marker is small or distorted. Furthermore, depending on a condition of the lighting for the marker, there is a case where a checkered pattern of the marker on an image does not look like the checkered pattern. For example, in a case of a marker having a black and white checkered pattern, when the light is strong and bright, a white region in the checkered pattern of the marker seen on an image looks like expanded. On the other hand, when the light is weak and dusky, a white region in the checkered pattern of the marker seen on an image looks like contracted. It is difficult to detect border lines between different color regions in the checkered pattern of the marker from such an unclear marker image and extract a feature point of the marker. Therefore, if an image is unclear, the above-described conventional technology has a difficulty to accurately extract a feature point of a marker.

Incidentally, even when an image of a marker is taken with a camera other than a wide angle camera, the marker image may be substantially distorted at a portion of the image near the edge of the image plane, and also is affected by the influence of the lighting, and therefore, the marker image is highly likely to be unclear. Consequently, even when an image of the marker is taken with a camera other than a wide angle camera, there is a case where the above-described conventional technology has a difficulty to accurately extract a feature point of the marker from an unclear marker image.

SUMMARY

According to an aspect of an embodiment, a computer-readable recording medium has stored therein an image processing program for causing a computer to execute a process including identifying, on a taken image of a jig having a plurality of first color regions and a plurality of second color regions different in color from the first color regions, the first color regions, comparing each of the identified first color regions with a predetermined convex shape and retracting each of the first color regions until it is determined that each of the first color regions has a similarity in shape to the predetermined convex shape, and determining a feature point of the jig on the image on the basis of a positional relationship of a plurality of first retracted regions on the image, the first retracted regions being obtained from the first color regions as a result of retraction at the retracting.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Incidentally, the present invention is not limited to the embodiments to be hereinafter described. Incidentally, in the embodiments described below, as an embodiment of the image processing program and image processing apparatus according to the present invention, there is described a technology to take an image of jigs (hereinafter, also referred to as "markers") placed around a vehicle with a camera mounted on the vehicle and determine respective coordinates of the markers on the image.

[a] First Embodiment

Figure 1:
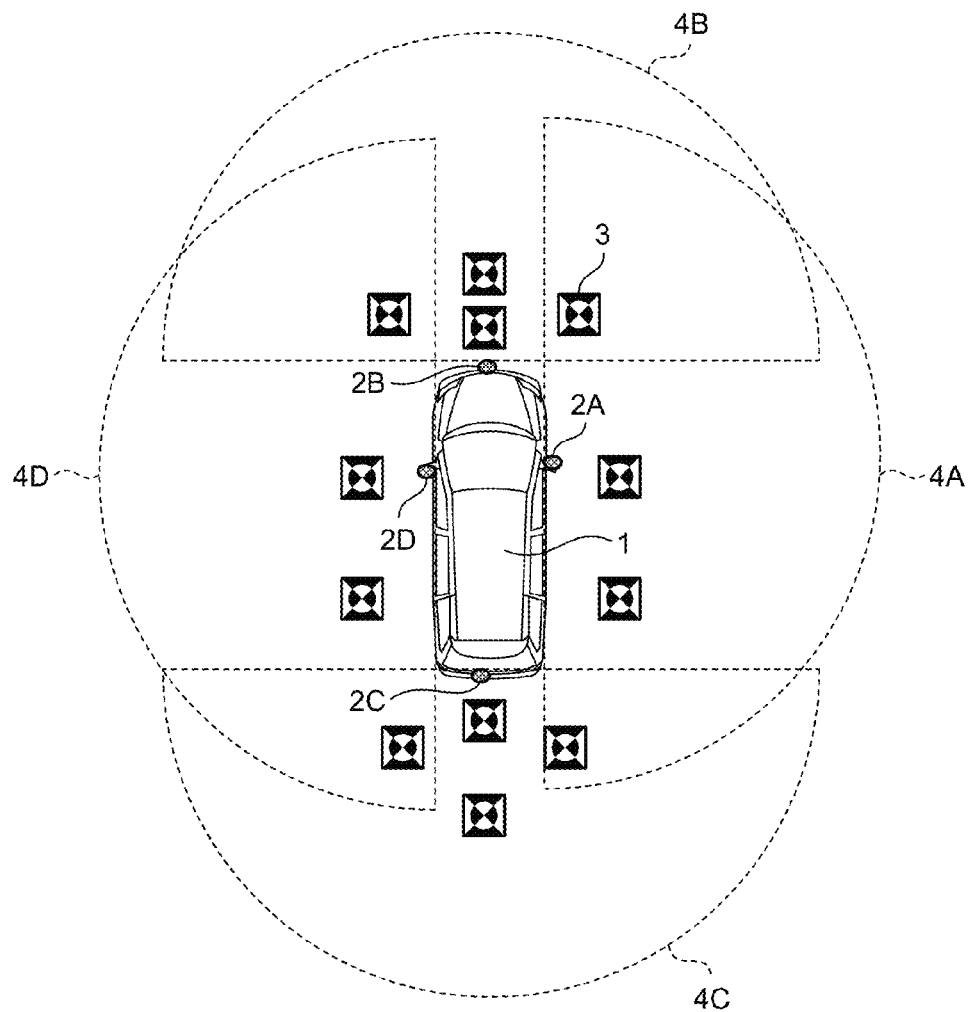
FIG. 1 is a diagram illustrating an example of the placement of markers according to a first embodiment.

FIG. 1 is a diagram illustrating an example of the placement of markers according to a first embodiment. A reference numeral 1 illustrated in FIG. 1 denotes a vehicle. Reference numerals 2A to 2D illustrated in FIG. 1 denote cameras mounted on the vehicle. A reference numeral 3 illustrated in FIG. 1 denotes a marker. Reference numerals 4A to 4D illustrated in FIG. 1 denote respective shooting ranges of the cameras 2A to 2D mounted on the vehicle 1. As illustrated in FIG. 1, the shooting range 4A of the camera 2A is partially overlapped with the shooting range 4B of the camera 2B and the shooting range 4C of the camera 2C. Furthermore, the shooting range 4D of the camera 2D is partially overlapped with the shooting range 4B of the camera 2B and the shooting range 4C of the camera 2C.

The vehicle 1 is brought to a stop at a predetermined stop position. Then, markers 3 are placed around the vehicle 1 so that each of the cameras 2A to 2D mounted on the vehicle 1 can take an image of at least four markers. At this time, the markers 3 are placed so that two of four markers 3 filmed by a camera are also filmed by cameras adjacent to the camera. For example, the markers 3 are placed so that one of four markers 3 filmed by the camera 2A is also filmed by the camera 2B adjacent to the camera 2A, and another one of the four markers 3 filmed by the camera 2A is also filmed by the camera 2C adjacent to the camera 2A. Namely, one of four markers 3 filmed by a camera just has to be placed in an area where a shooting range of the camera and a shooting range of a camera adjacent to the camera are overlapped, and another one of the four markers 3 filmed by the camera just has to be placed in an area where the shooting range of the camera and a shooting range of the other adjacent camera are overlapped; however, it is assumed that the positions of the markers 3 to be placed with respect to the vehicle 1, including the positions in such overlapping areas, are measured in advance.

Figure 2:
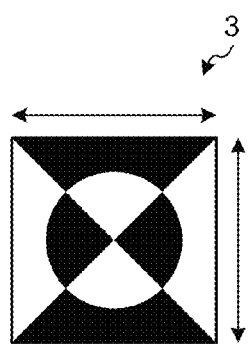
FIG. 2 is a diagram illustrating an example of the shape of the marker according to the first embodiment.

FIG. 2 is a diagram illustrating an example of the shape of the marker according to the first embodiment. As illustrated in FIG. 2, the marker 3 is, for example, shaped into a square of about forty centimeters on each side and has a circular portion in the center of the square. Furthermore, as illustrated in FIG. 2, the marker 3 has, for example, a checkered pattern composed of alternate black and white regions. The circular portion of the marker 3 is composed of paired white regions facing each other across the center of the marker 3 and paired black regions facing each other across the center of the marker 3. The reason why the marker 3 is formed into, for example, a black and white checkered pattern is because it is intended to make the center of the circular portion of the marker 3 accurately appear on an image of the marker 3 as a feature point. Furthermore, the reason why a region surrounding the circular portion of the marker 3 is also formed into a checkered pattern is because it is intended to make the boundary of the circular portion of the marker 3 clearly appear on the image of the marker 3 without being influenced by a background outside of the marker 3, i.e., an image of a floor on which the marker 3 is placed.

Configuration of Image Processing Apparatus (First Embodiment)

Figure 3:
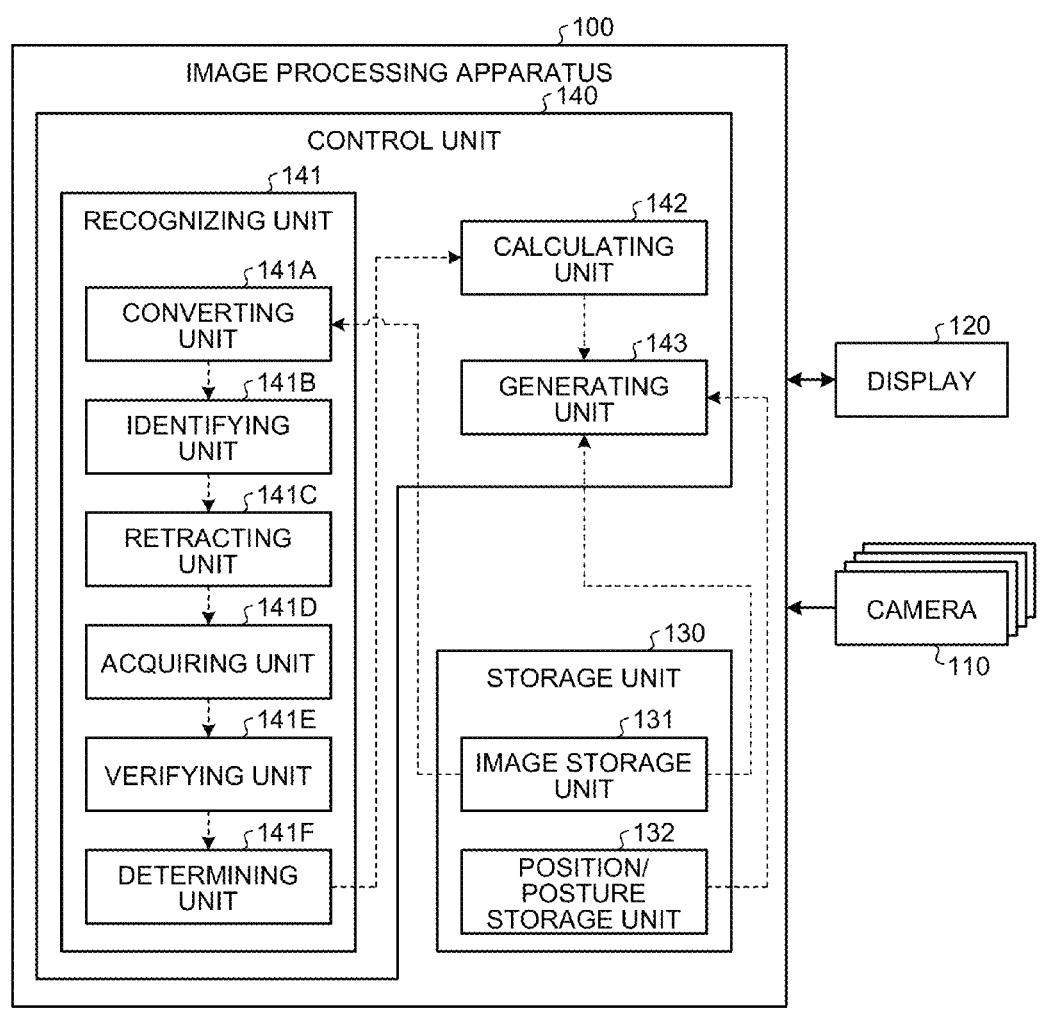
FIG. 3 is a functional block diagram illustrating a configuration of an image processing apparatus according to the first embodiment.

FIG. 3 is a functional block diagram illustrating a configuration of an image processing apparatus according to the first embodiment. As illustrated in FIG. 3, an image processing apparatus 100 according to the first embodiment is connected to multiple cameras 110 and a display 120, and includes a storage unit 130 and a control unit 140.

The cameras 110 each acquire an image of markers 3 placed around the vehicle 1. The display 120 displays thereon, for example, a synthetic image of respective images acquired by the cameras 110. Incidentally, the display 120 can be configured to include an input device, such as a touch panel, to implement the function of a pointing device. For example, the touch panel of the display 120 accepts operator's input, such as an instruction to start calculation of the position/posture of each camera 110 or an instruction to output the synthetic image.

The storage unit 130 includes, as illustrated in FIG. 3, an image storage unit 131 and a position/posture storage unit 132. Incidentally, the storage unit 130 is, for example, a semiconductor memory device, such as a random access memory (RAM) or a flash memory.

The image storage unit 131 stores therein images of markers 3 acquired by the cameras 110. The position/posture storage unit 132 stores therein information on the position/posture of each camera 110 calculated by a calculating unit 142 to be described below.

The control unit 140 includes, as illustrated in FIG. 3, a recognizing unit 141, the calculating unit 142, and a generating unit 143.

The recognizing unit 141 determines a feature point of the marker 3 on an image of the marker 3. As illustrated in FIG. 3, the recognizing unit 141 includes a converting unit 141A, an identifying unit 141B, a retracting unit 141C, an acquiring unit 141D, a verifying unit 141E, and a determining unit 141F.

The converting unit 141A retrieves an original image of markers 3 acquired by each camera 110 from the image storage unit 131, and changes the brightness of the retrieved image thereby converting the original image of markers 3 acquired by each camera 110 into a grayscale image.

Figure 4:
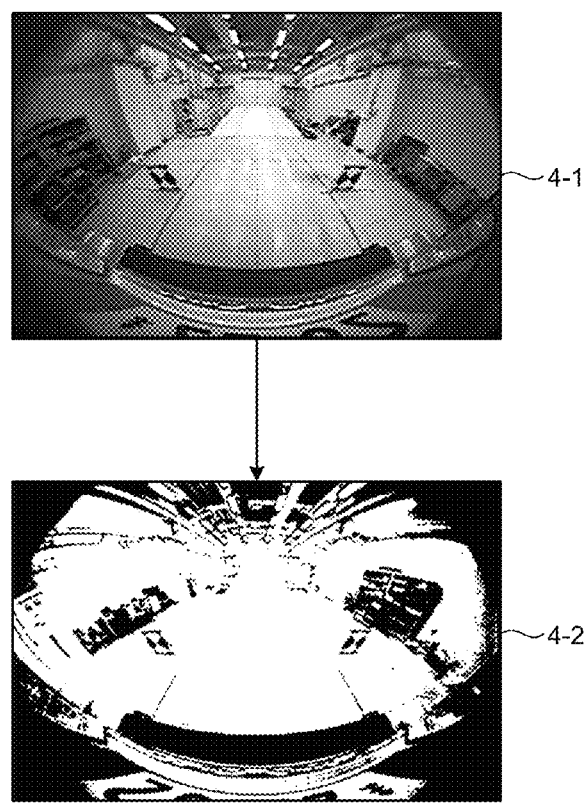
FIG. 4 is a diagram for explaining the operation of a converting unit 141A according to the first embodiment.

FIG. 4 is a diagram for explaining the operation of the converting unit 141A according to the first embodiment. An image 4-1 illustrated in FIG. 4 is an original image of markers 3 acquired by the camera 110, and an image 4-2 illustrated in FIG. 4 is a grayscale image of the markers 3. The converting unit 141A changes the brightness of the original image 4-1 of the markers 3 acquired by the camera 110 using the following equation (1), thereby converting the original image 4-1 into the grayscale image 4-2 as illustrated in FIG. 4.

$$G(x) = 0.299 * Ir(x) + 0.587 * Ig(x) + 0.14 * Ib(x) \quad (1)$$

Ir(x), Ig(x), Ib(x) denote R, G, and B component values of an input image I(x) on a coordinate x, respectively.

The identifying unit 141B generates a binary image from a grayscale image. For example, the identifying unit 141B compares each of pixel values of pixels composing a grayscale image with a predetermined threshold, and binarizes a pixel of which the pixel value is larger than the predetermined threshold to "1" and binarizes a pixel of which the pixel value is equal to or smaller than the predetermined threshold to "0", thereby generating a binary image from the grayscale image. In other words, the identifying unit 141B identifies a white region and a black region on the grayscale image. Incidentally, the predetermined threshold does not have to be a fixed value, and can be locally or wholly, dynamically determined on the basis of a target image. As publicly-known methods, there are the Otsu's discrimination method and the NiBlack's method, etc.

The retracting unit 141C performs a retracting process to retract a binary image generated by the identifying unit 141B until the shape of a binarized region in the binary image is judged as having a similarity to a predetermined convex shape, for example, an elliptical shape.

For example, when an image of a marker 3 is unclear, the image looks like as if a white region in a circular portion of the marker 3 and a white region outside of the circular portion of the marker 3 were connected. Incidentally, when the image of the marker 3 is unclear, the image looks like as if a black region in the circular portion of the marker 3 and a black region outside of the circular portion of the marker 3 were connected just like the white regions. Here, it has been found that in a state where the white and black regions in the circular portion of the marker 3 are completely separated from the other regions in the image of the marker 3, the white and black regions in the circular portion of the marker 3 are similar to a predetermined convex shape, for example, an elliptical shape. Therefore, the retracting unit 141C repeatedly retracts each of color regions in the binary image until the color region is judged as having a similarity to the elliptical shape, so that the region in the circular portion of the marker 3 can be completely separated from a color region outside of the circular portion of the marker 3. The retracting process includes a step of completely separating a white region in a circular portion of a marker 3 from a white region outside of the circular portion of the marker 3 and a step of completely separating a black region in the circular portion of the marker 3 from a black region outside of the circular portion of the marker 3.

The retracting unit 141C first performs the retracting process on a white region of which the value is "1" in a binary image. The retracting unit 141O labels the white region of which the value is "1" in the binary image. Then, the retracting unit 141O derives the major and minor axes of a pseudo ellipse fitting into the labeled white region using the publicly-known calculation method based on the moment of inertia indicated by the following equation (2).

$$a = \sqrt{2} \sqrt{\mu_{20} + \mu_{02} + \sqrt{(\mu_{20} - \mu_{02})^2 + 4\mu_{11}^2}} \quad (2)$$

$$b = \sqrt{2} \sqrt{\mu_{20} + \mu_{02} - \sqrt{(\mu_{20} - \mu_{02})^2 + 4\mu_{11}^2}}$$

$$\mu_{20} = \frac{MG_{02}}{M_{00}} = \frac{1}{M_{00}}\left(M_{20} - \frac{M_{10}^2}{M_{00}}\right)$$

$$\mu_{11} = \frac{MG_{11}}{M_{00}} = \frac{1}{M_{00}}\left(M_{11} - \frac{M_{10}M_{01}}{M_{00}}\right)$$

$$\mu_{02} = \frac{MG_{02}}{M_{00}} = \frac{1}{M_{00}}\left(M_{02} - \frac{M_{01}^2}{M_{00}}\right)$$

$$M_{ij} = \sum_{x,y} X^i y^j BW(x, y)$$

Then, with respect to each of white regions, the retracting unit 141C determines whether a ratio of an area of a white region to an area of a pseudo ellipse fitting into the white region is equal to or smaller than a predetermined threshold, and, if the area ratio is equal to or smaller than the predetermined threshold, judges that the white region has an elliptical shape property, i.e., has a similarity to an elliptical shape. A basis to judge a similarity to an elliptical shape is as follows. For example, in a state where an image of a marker 3 looks like as if a white region in a circular portion of the marker 3 and a white region outside of the circular portion of the marker 3 were connected, an area of the white region is very different from an area of a pseudo ellipse fitting into the white region. On the other hand, in a state where a white region in a circular portion of a marker 3 and a white region outside of the circular portion of the marker 3 are completely separated, an area of the white region is not very different from an area of a pseudo ellipse fitting into the white region. Therefore, to evaluate a state where a white region in a circular portion of a marker 3 and a white region outside of the circular portion of the marker 3 are completely separated, whether a ratio of an area of the white region to an area of a pseudo ellipse fitting into the white region is equal to or smaller than the predetermined threshold is determined.

Here, as an example of a method for the determination, the following formula for evaluation E can be used.

$$E = |(\text{area of white region}) - (\text{area of ellipse})| / \max(\text{area of white region}, \text{area of ellipse})$$

This evaluation formula evaluates a ratio of a difference between an area of a white region and an area of an ellipse to the area of the white region or the ellipse, whichever is greater. Therefore, the closer a value of E is to zero, the more the shape of the white region is similar to an elliptical shape. Incidentally, not only this evaluation formula but any other evaluation formulae can be used as long as a value capable of evaluating how similar the shape of a white region is to an elliptical shape fitting into the white region is calculated by the evaluation formula. When a value calculated by the formula for evaluation E is equal to or smaller than the predetermined threshold, for example, is 0.3, the white region can be judged as being similar to an ellipse. Incidentally, the predetermined threshold can be determined in advance in such a manner that the retracting unit 141C performs the above-described determination process on a plurality of images to be evaluated as a preliminary experiment and determines a value capable of appropriately separating a white region relevant to all marker regions as the predetermined threshold.

Incidentally, an area of the white region can be calculated by counting pixels in the region. An area of the ellipse can be calculated by multiplying the product of the major and minor axes of the ellipse derived using the above equation (2) by the circular constant.

Furthermore, the marker 3 may look considerably distorted due to lens distortion of the camera 110; in such a case, a white region in a circular portion of the marker 3 looks an elongate shape. Therefore, depending on whether the white region in the circular portion of the marker 3 looks a relatively circular shape or an elongate shape, the predetermined threshold for evaluating a ratio of an area of a white region to an area of a pseudo ellipse fitting into the white region can be changed. For example, when a ratio of the minor axis of the pseudo ellipse to the major axis is larger than 0.4, i.e., the shape of the white region is closer to a circle, the retracting unit 141C can adopt 0.3 as the predetermined threshold to be compared with a value calculated by the above-described formula for evaluation E. In the experiment, when the shape of the white region is close to a shape of a quarter of the circular portion illustrated in FIG. 2, a ratio of the minor axis to the major axis was larger than 0.4 in most cases. Furthermore, for example, when a ratio of the minor axis of the pseudo ellipse to the major axis is equal to or smaller than 0.4, i.e., the shape of the white region is closer to an elongate shape, the retracting unit 141C can adopt 0.2 as the predetermined threshold to be compared with a value calculated by the above-described formula for evaluation E. In the experiment, when the shape of the white region is an elongate shape, a ratio of the minor axis to the major axis was equal to or smaller than 0.4 in most cases. Incidentally, the threshold for a ratio of the minor axis to the major axis and the predetermined threshold to be compared with a value calculated by the above-described formula for evaluation E can be determined in advance in such a manner that the retracting unit 141C performs the above-described determination process on a plurality of images to be evaluated as a preliminary experiment. Namely, the retracting unit 141C can perform the above-described determination process on a plurality of images to be evaluated as a preliminary experiment and determine a value capable of appropriately separating a white region relevant to all marker regions as the predetermined threshold in advance.

Furthermore, the retracting unit 141C can be configured to use another index in addition to the above-described thresholds to judge whether each white region has an elliptical shape property more effectively. The retracting unit 141C evaluates, for example, the number of holes within a white region. For example, as for a white region in a binary image, the number of holes corresponds to the number of black regions present in the white region; as for a black region in a binary image, the number of holes corresponds to the number of white regions present in the black region. As a result of the evaluation, as for a white region without any hole, the retracting unit 141C can be configured to determine a ratio of an area of the white region to an area of a pseudo ellipse fitting into the white region. As a method for calculating the number of holes, for example, there is a method to calculate the publicly-known Euler number and evaluate that the Euler number is 1, i.e., the number of holes is 0.

Furthermore, the retracting unit 141C evaluates, for example, a degree of distortion in the external form of a white region, and, as for a white region having a low degree of distortion, the retracting unit 141C can be configured to determine a ratio of an area of the white region to an area of a pseudo ellipse fitting into the white region. In a case of evaluating a degree of distortion in the external form of a white region, the retracting unit 141C acquires pixels located at the peripheral edge of the white region by the publicly-known chain coding, and sequentially measures respective directions of the pixels located at the peripheral edge of the white region from a centroid of the white region. Then, the retracting unit 141C evaluates a degree of distortion of the white region on the basis of a graph of the measured directions.

Figure 5:
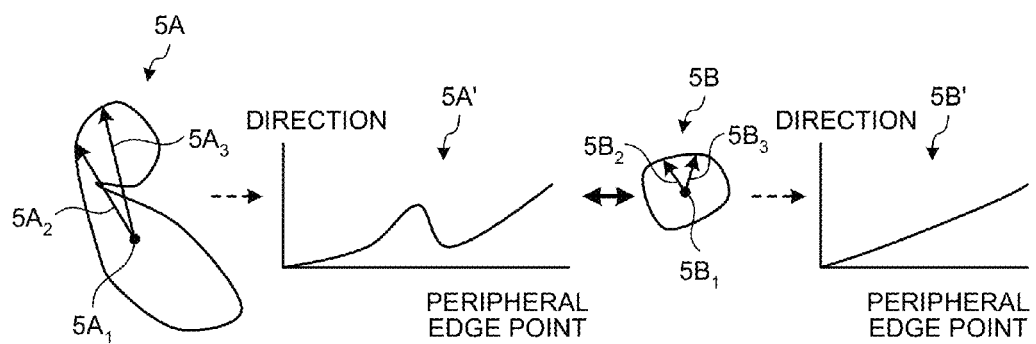
FIG. 5 is a diagram for explaining a method for evaluation of a degree of distortion in the external form of a white region according to the first embodiment.

FIG. 5 is a diagram for explaining a method for evaluation of a degree of distortion in the external form of a white region according to the first embodiment. 5A illustrated in FIG. 5 depicts a white region of which the external form is distorted; $5A_1$ denotes a centroid of the white region 5A; $5A_2$ and $5A_3$ denote directions from the centroid $5A_1$. 5A' illustrated in FIG. 5 is a graph for evaluation of a degree of distortion in the external form of the white region 5A. Incidentally, the vertical axis of the graph illustrated in 5A' indicates a direction of each pixel located at the peripheral edge of the white region 5A from the centroid of the white region 5A; the horizontal axis of the graph illustrated in 5A' indicates a peripheral edge point of the white region 5A. 5B illustrated in FIG. 5 depicts a white region of which the external form is not distorted; $5B_1$ denotes a centroid of the white region 5B; $5B_2$ and $5B_3$ denote directions from the centroid $5B_1$. 5B' illustrated in FIG. 5 is a graph for evaluation of a degree of distortion in the external form of the white region 5B. Incidentally, the vertical axis of the graph illustrated in 5B' indicates a direction of each pixel located at the peripheral edge of the white region 5B from the centroid of the white region 5B; the horizontal axis of the graph illustrated in 5B' indicates a peripheral edge point of the white region 5B. For example, the retracting unit 141C evaluates a degree of distortion of the white regions 5A and 5B on the basis of the graphs illustrated in 5A' and 5B'. For example, in the white region 5A of which the external form is distorted, directions from the centroid are concentrated in a distorted part; therefore, the graph exhibits not a monotonic increase but a warped curve as illustrated in 5A'. On the other hand, in the white region 5B of which the external form is not distorted, directions from the centroid are dispersed; therefore, the graph exhibits a monotonic increase as illustrated in 5B'. Therefore, the retracting unit 141C evaluates, for example, whether a distortion-free white region, i.e., the white region 5B represented in the graph exhibiting a monotonic increase as illustrated in 5B' has an elliptical shape property.

Then, the retracting unit 141C copies a white region judged as having a similarity to an elliptical shape onto an internal first buffer that the retracting unit 141C includes. On the other hand, the retracting unit 141C copies a white region judged as not having a similarity to an elliptical shape onto an internal second buffer that the retracting unit 1410 includes.

When having copied a white region onto the buffer, the retracting unit 141C determines whether all the labeled white regions have been subjected to the above-described judgment on a similarity to an elliptical shape. As a result of the determination, when it is determined that all the white regions have not been subjected to the judgment on a similarity to an elliptical shape, the retracting unit 141C judges whether the remaining white regions have a similarity to an elliptical shape in the same way as described above. On the other hand, as a result of the determination, when it is determined that all the white regions have been subjected to the judgment on a similarity to an elliptical shape, the retracting unit 141C performs the retracting process on each of the white regions copied onto the second buffer. The retracting unit 141C can use any publicly-known technologies concerned with the retracting process, such as a method to remove pixels located at the periphery of the white region, i.e., the edge of the white region one by one and a method to remove pixels located at the edge of the white region using a predetermined filter. This ends one cycle of the retracting process performed by the retracting unit 141C.

After completion of one cycle of the retracting process, the retracting unit 141C labels each of the retracted white regions anew, and performs the above-described retracting process on each of the white regions again. Incidentally, the retracting unit 141C performs the retracting process until there is no more white region to be subjected to the retracting process in the binary image or performs the retracting process the preset number of times.

When having performed the retracting process on the white regions of which the value is "1" in the binary image, the retracting unit 141C outputs the white regions copied onto the first buffer to the acquiring unit 141D. Then, the retracting unit 141C performs the above-described retracting process on the black regions of which the value is "0" in the binary image. By reversing the values of the binary image and treating the black regions the same as the white regions, the retracting unit 141C can perform the retracting process by the same procedure as described above. Incidentally, when having performed the retracting process on the black regions of which the value is "0" in the binary image, the retracting unit 141C outputs the black regions copied onto the first buffer to the acquiring unit 141D.

Figure 6:
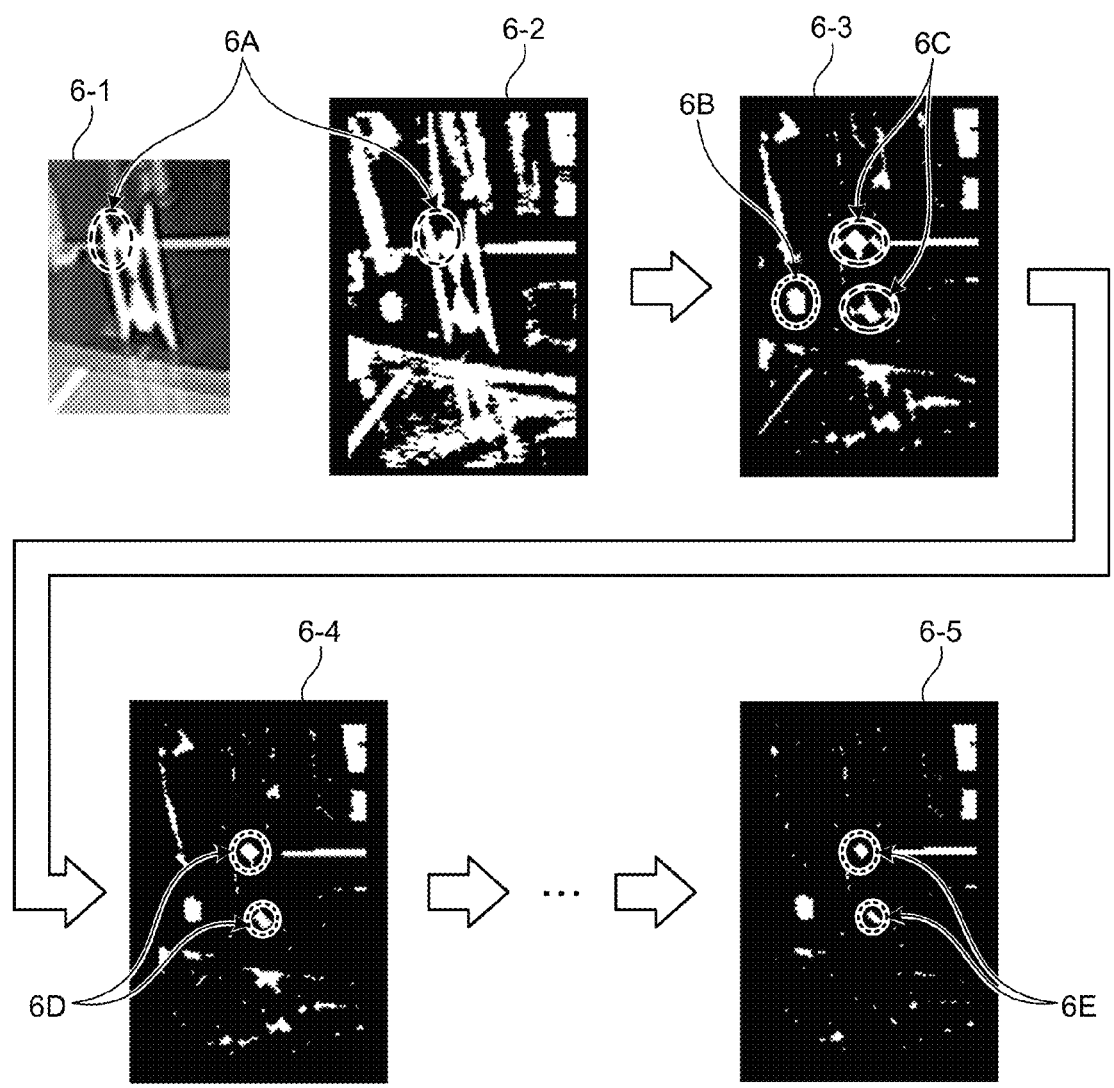
FIG. 6 is a diagram for explaining the operation of a retracting unit 141C according to the first embodiment.

FIG. 6 is a diagram for explaining the operation of the retracting unit 141C according to the first embodiment. An image 6-1 illustrated in FIG. 6 is a grayscale image. An image 6-2 illustrated in FIG. 6 is a binary image. An image 6-3 illustrated in FIG. 6 is a binary image obtained by retracting color regions in the binary image 6-2 several times. An image 6-4 illustrated in FIG. 6 is a binary image obtained by further retracting the binary image 6-3. An image 6-5 illustrated in FIG. 6 is a binary image at the time of completion of the retracting process.

As illustrated in 6A of FIG. 6, at the time when the binary image has been generated from the grayscale image, it is unclear as if two white regions in a marker 3, which are different regions originally, were connected on the image. Therefore, the retracting unit 141C performs the above-described retracting process to separate the white regions. For example, the retracting unit 141C performs the above-described retracting process on the binary image 6-2 several times, and as a result, acquires, for example, the binary image 6-3. Here, when a white region 6B in the binary image 6-3 has a similarity to an elliptical shape, the retracting unit 141C copies the white region 6B onto the first buffer. On the other hand, when white regions 6C in the binary image 6-3 each have no similarity to an elliptical shape, the retracting unit 141C copies the white regions 6C onto the second buffer. Then, the retracting unit 141C performs the retracting process on each of the white regions 6C copied onto the second buffer, and acquires the binary image 6-4. And then, the retracting unit 1410 labels white regions 6D in the binary image 6-4 anew, and initiates the retracting process on each of the labeled white regions 6D anew.

As a result of several cycles of the retracting process, the retracting unit 141C acquires the binary image 6-5 from the binary image 6-4. Here, when white regions 6E in the binary image 6-5 each have a similarity to an elliptical shape, the retracting unit 1410 copies the white regions 6E onto the first buffer. When having copied the white regions 6E onto the first buffer, the retracting unit 141C completes the retracting process because there is no more white region to be labeled in the binary image 6-5.

To return to FIG. 3, the acquiring unit 141D acquires a pair of paired white regions and paired black regions meeting predetermined conditions for evaluation of the shape similarity to a marker from multiple white regions and multiple black regions which have been output from the retracting unit 141C. In other words, the acquiring unit 141D acquires a pair of paired white regions and paired black regions having a high probability of composing a circular portion of a marker 3.

For example, the acquiring unit 141D acquires two regions P1 and P2 from multiple white regions output from the retracting unit 141C, and also acquires two regions N1 and N2 from multiple black regions output from the retracting unit 141C. Next, the acquiring unit 141D calculates a centroid CP1 of the region P1, a centroid CP2 of the region P2, a centroid CN1 of the region N1, and a centroid CN2 of the region N2. Then, the acquiring unit 141D determines whether a pair of the regions P1 and P2 and the regions N1 and N2 meets the following conditions (1) to (3).

Figure 7:
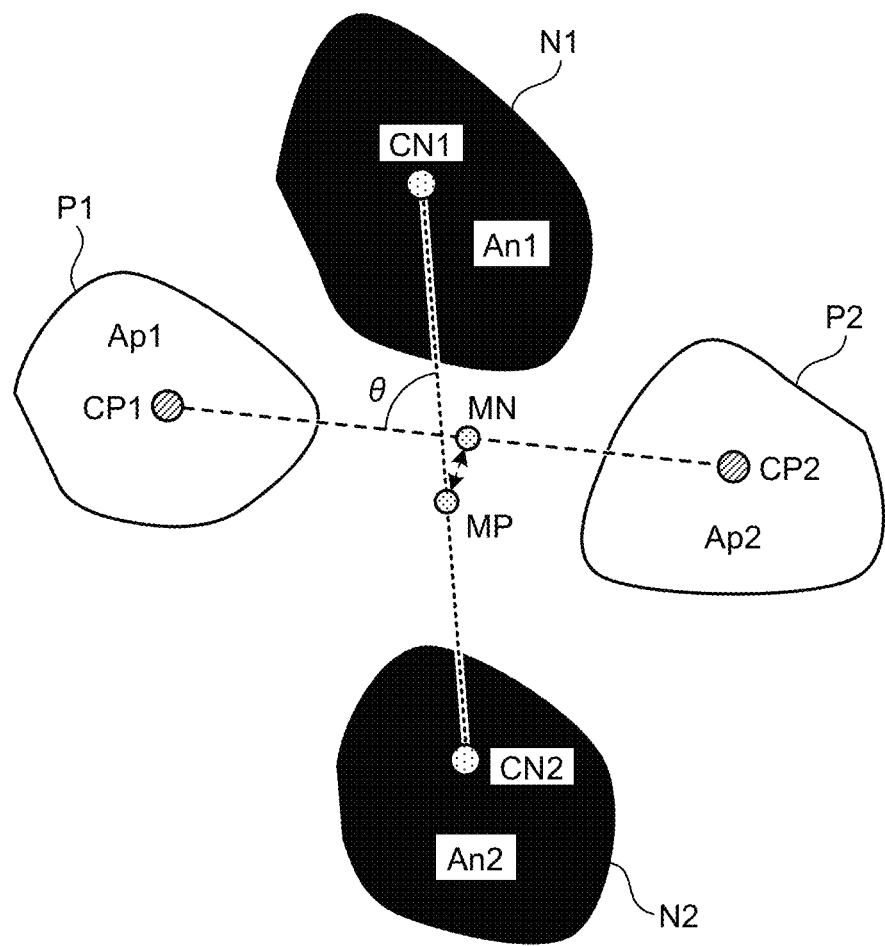
FIG. 7 is a diagram illustrating a model of a pair of regions P1 and P2 and regions N1 and N2 according to the first embodiment.

FIG. 7 is a diagram illustrating a model of a pair of the regions P1 and P2 and the regions N1 and N2 according to the first embodiment. The conditions (1) to (3) for evaluation of the shape similarity to a marker are as follows.

Condition (1): A line CP1CP2 illustrated in FIG. 7 and a line CN1CN2 illustrated in FIG. 7 intersect Condition (2): An angle θ between the line CP1CP2 illustrated in FIG. 7 and the line CN1CN2 is equal to or more than a predetermined angle value Condition (3): A distance between a midpoint MP of the line CP1CP2 illustrated in FIG. 7 and a midpoint MN of the line CN1CN2 illustrated in FIG. 7 is equal to or less than a predetermined value Furthermore, the acquiring unit 141D can be configured to further determine whether the pair of the regions P1 and P2 and the regions N1 and N2 meets the following conditions (4) and (5) in addition to the above-described conditions (1) to (3).

Condition (4): A ratio of an area Ap1 of the region P1 illustrated in FIG. 7 to an area Ap2 of the region P2 illustrated in FIG. 7 is equal to or more than a predetermined value Condition (5): A ratio of an area An1 of the region N1 illustrated in FIG. 7 to an area An2 of the region N2 illustrated in FIG. 7 is equal to or more than a predetermined value As for the angle θ, the distance between the midpoints, and areas of the white and black regions in the circular portion of the marker 3 which are included in the above-described conditions, rough predicted values supposed to be obtained on a camera image are calculated. For example, information on the size of the marker 3, the placement position of the marker 3, and the position of the in-vehicle camera can be obtained, so rough predicted values of the angle θ, the distance between the midpoints, and areas of the white and black regions in the circular portion of the marker 3 supposed to be obtained on a camera image can be calculated on the basis of the information. Then, the predetermined values in the above-described conditions can be set in consideration of an error between the predicted value and an actual value and the influence of the retracting process. For example, when a predicted value of the angle θ is 80 degrees, the predetermined angle value in the above-described condition (2) can be set to 60 degrees or more in consideration of the influence of the retracting process. Furthermore, for example, when a predicted value of the distance between the midpoints is 1 pixel, the predetermined value in the above-described condition (3) can be set to 3 pixels in consideration of the influence of the retracting process. Moreover, for example, when a predicted value of an area of a white region in the circular portion of the marker 3 is 100 pixels and a predicted value of an area of a black region in the circular portion of the marker 3 is 120 pixels, the predetermined value in the above-described conditions (4) and (5) can be set to 0.5 or more in consideration of the influence of the retracting process.

Incidentally, the acquiring unit 141D can be configured to determine whether the pair of the regions P1 and P2 and the regions N1 and N2 meets at least the conditions (1) and (2) out of the above-described conditions (1) to (3). Furthermore, besides the above-described conditions (1) and (2), the acquiring unit 141D can adopt any combination of proper conditions.

As a result of the determination, when the pair of the regions P1 and P2 and the regions N1 and N2 meets the conditions (1) to (3) or the conditions (1) to (5) or the conditions (1) and (2), the acquiring unit 141D acquires this pair. The acquiring unit 141D performs the determination of whether a pair meets the conditions with respect to all exclusive pairs of paired white regions and paired black regions that can be paired up among the multiple white regions and the multiple black regions which have been output from the retracting unit 141C. Then, the acquiring unit 141D outputs all the acquired pairs to the verifying unit 141E.

The verifying unit 141E verifies multiple pairs of paired white regions and paired black regions output from the acquiring unit 141D to select a pair which is most likely to be a marker 3.

Figure 8:
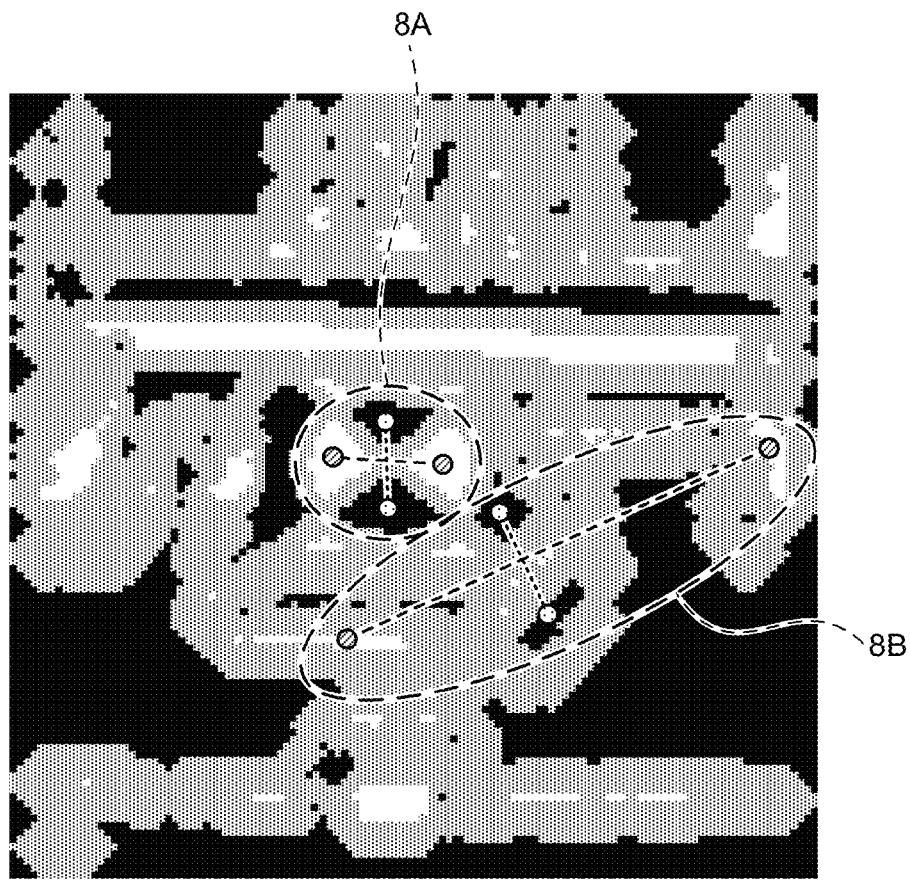
FIG. 8 is a diagram illustrating an example of pairs output from an acquiring unit 141D according to the first embodiment.

FIG. 8 is a diagram illustrating an example of pairs output from the acquiring unit 141D according to the first embodiment. The acquiring unit 141D has output 8A and 8B illustrated in FIG. 8 to the verifying unit 141E as a pair of paired white regions and paired black regions meeting the above-described conditions (1) to (3). The verifying unit 141E calculates an evaluation value for evaluating the possibility of being a marker 3 with respect to the pairs 8A and 8B illustrated in FIG. 8.

Figure 9:
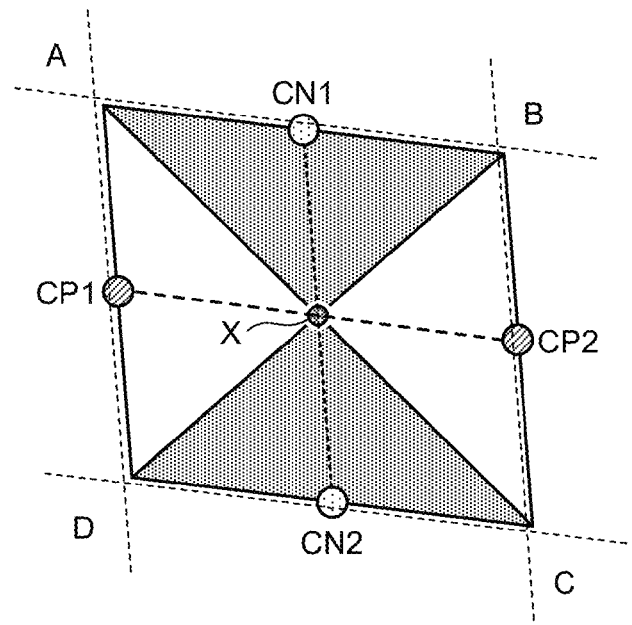
FIG. 9 is a diagram illustrating an example of a binary template used in calculation of an evaluation value for evaluating the possibility of being a marker 3 according to the first embodiment.

FIG. 9 is a diagram illustrating an example of a binary template used in the calculation of an evaluation value for evaluating the possibility of being a marker 3 according to the first embodiment. With respect to each of the pairs output from the acquiring unit 141D, the verifying unit 141E calculates an intersection point X between a line CP1CP2 and a line CN1CN2 and obtains a parallelogram ABCD on the basis of the intersection point X as illustrated in FIG. 9. Next, the verifying unit 141E generates a binary template in which values of triangles XAB and XCD are "−1" and values of triangles XAD and XBC are "1". Incidentally, the parallelogram ABCD is defined as follows.

XA vector=XCN1 vector+XCP1 vector
XB vector=XCN1 vector+XCP2 vector
XC vector=XCN2 vector+XCP2 vector
XD vector=XCN2 vector+XCP1 vector Then, the verifying unit 141E calculates a similarity between a grayscale image and the binary template at the intersection point X between the lines CP1CP2 and CN1CN2, and determines whether the similarity is equal to or more than a predetermined threshold. For example, the verifying unit 141E aligns the intersection point X of the grayscale image on the center of the binary template, and multiplies respective pixel values of pixels located at corresponding coordinates together and adds up the multiplied pixel values, thereby calculating a similarity between the grayscale image and the binary template at the intersection point X. When a similarity between the grayscale image and the binary template at the intersection point X is denoted by F, the verifying unit 141E can calculate the similarity F using the following equation (3).

$$F=\Sigma G(x)\times T(x)/R \qquad (3)$$

x: A coordinate in an area of the parallelogram ABCD
R: An area of the parallelogram ABCD As a result of the determination, the verifying unit 141E retains a pair of which the similarity is equal to or more than the predetermined threshold and rejects a pair of which the similarity is less than the predetermined threshold. Then, the verifying unit 141E outputs coordinates of the intersection point X on the pair of which the similarity is equal to or more than the predetermined threshold as provisional central coordinates of the marker 3 to the determining unit 141F. Incidentally, the predetermined threshold to be compared with a similarity can be determined in advance in such a manner that the verifying unit 141E performs the above process on a plurality of images to be evaluated as a preliminary experiment and determines a similarity F capable of correctly adopting all marker regions as the predetermined threshold. Or, if it is based on the assumption that there is one marker 3 in a region to be subjected to the process performed by the verifying unit 141E, a pair can be selected as follows. For example, the verifying unit 141E selects a pair having the highest similarity F among multiple pairs of paired white regions and paired black regions output from the acquiring unit 141D on the basis of respective similarities F of the pairs.

The determining unit 141F performs a coordinate refining process for refining the provisional central coordinates which is coordinates of the intersection point X output from the verifying unit 141E, and makes a final determination on coordinates of the center of the circular portion of the marker 3, i.e., coordinates of a feature point of the marker 3. Contents of the coordinate refining process are explained below with reference to FIGS. 10 and 11.

Figure 10:
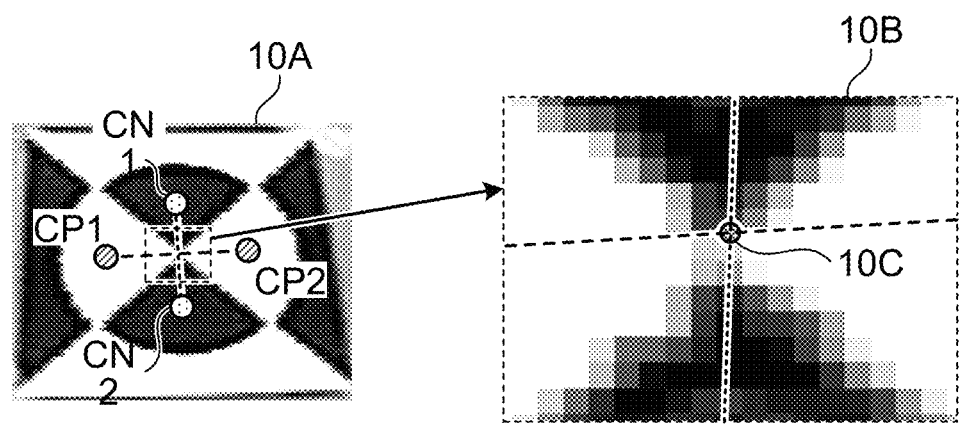
FIG. 10 is a diagram illustrating a positional relationship between the center of a marker 3 and an intersection point X on a grayscale image of the marker 3 according to the first embodiment.

FIG. 10 is a diagram illustrating a positional relationship between the center of a marker 3 and an intersection point X on a grayscale image of the marker 3 according to the first embodiment. 10A illustrated in FIG. 10 represents a grayscale image of the marker 3. 10B illustrated in FIG. 10 represents a magnified view of a rectangular area enclosed by a dotted line in the grayscale image 10A. 10C illustrated in FIG. 10 represents the position of the intersection point X calculated as the center of the marker on the grayscale image. The intersection point X between the lines CP1CP2 and CN1CN2 calculated by the verifying unit 141E is obtained by the respective centroids of the white regions P1 and P2 and the respective centroids of the black regions N1 and N2, and is calculated independently of the center of the marker 3 on the grayscale image of the marker 3. Therefore, as illustrated in 10B of FIG. 10, the position of the center of the marker 3 on the grayscale image of the marker 3 does not always coincide with the intersection point X calculated as the position of the center of the marker 3. Furthermore, for example, when the centroids of the white regions P1 and P2 and the centroids of the black regions N1 and N2 are asymmetric, the positional accuracy of the intersection point X calculated by the verifying unit 141E may not be improved depending on a state of retraction of color regions performed by the retracting unit 141C. Consequently, the determining unit 141F determines coordinates of the center of the marker on an image of the marker 3, i.e., coordinates of a feature point of the marker 3 with a higher degree of accuracy on the basis of image data around the intersection point X calculated by the verifying unit 141E.

First, the determining unit 141F generates a cross filter in predetermined size on the basis of a pair of the line CP1CP2 and the line CN1CN2 used in the calculation of the intersection point X by the verifying unit 141E. For example, the determining unit 141F calculates a direction $\theta p$ of the vector CP1CP2, and sets a coordinate of $\pm[T \cos \theta p, T \sin \theta p]$ to "1" with the center of the cross filter as the origin. Furthermore, the determining unit 141F calculates a direction $\theta n$ of the vector CN1CN2, and sets a coordinate of $\pm[T \cos \theta n, T \sin \theta n]$ to "−1" with the center of the cross filter as the origin. Incidentally, the coordinate of $\pm[T \cos \theta p, T \sin \theta p]$ takes an integer number. For example, where H denotes the cross filter, T=3, $\theta p$=0 degree, and $\theta n$=90 degrees, the cross filter generated by the determining unit 141F is expressed by the following equation (4). Namely, when with the center of the cross filter as the origin, the coordinate of the direction $\theta p$ of the vector CP1CP2 is "1" and the coordinate of the direction $\theta n$ of the vector CN1CN2 is "−1", the cross filter is defined by a diagram containing at least these coordinates.

$$H = [0\ 0\ 0\ -1\ 0\ 0\ 0;$$
$$0\ 0\ 0\ 0\ 0\ 0\ 0$$
$$0\ 0\ 0\ 0\ 0\ 0\ 0$$
$$1\ 0\ 0\ 0\ 0\ 0\ 1$$
$$0\ 0\ 0\ 0\ 0\ 0\ 0$$
$$0\ 0\ 0\ 0\ 0\ 0\ 0$$
$$0\ 0\ 0\ -1\ 0\ 0\ 0]; \quad (4)$$

Figure 11:
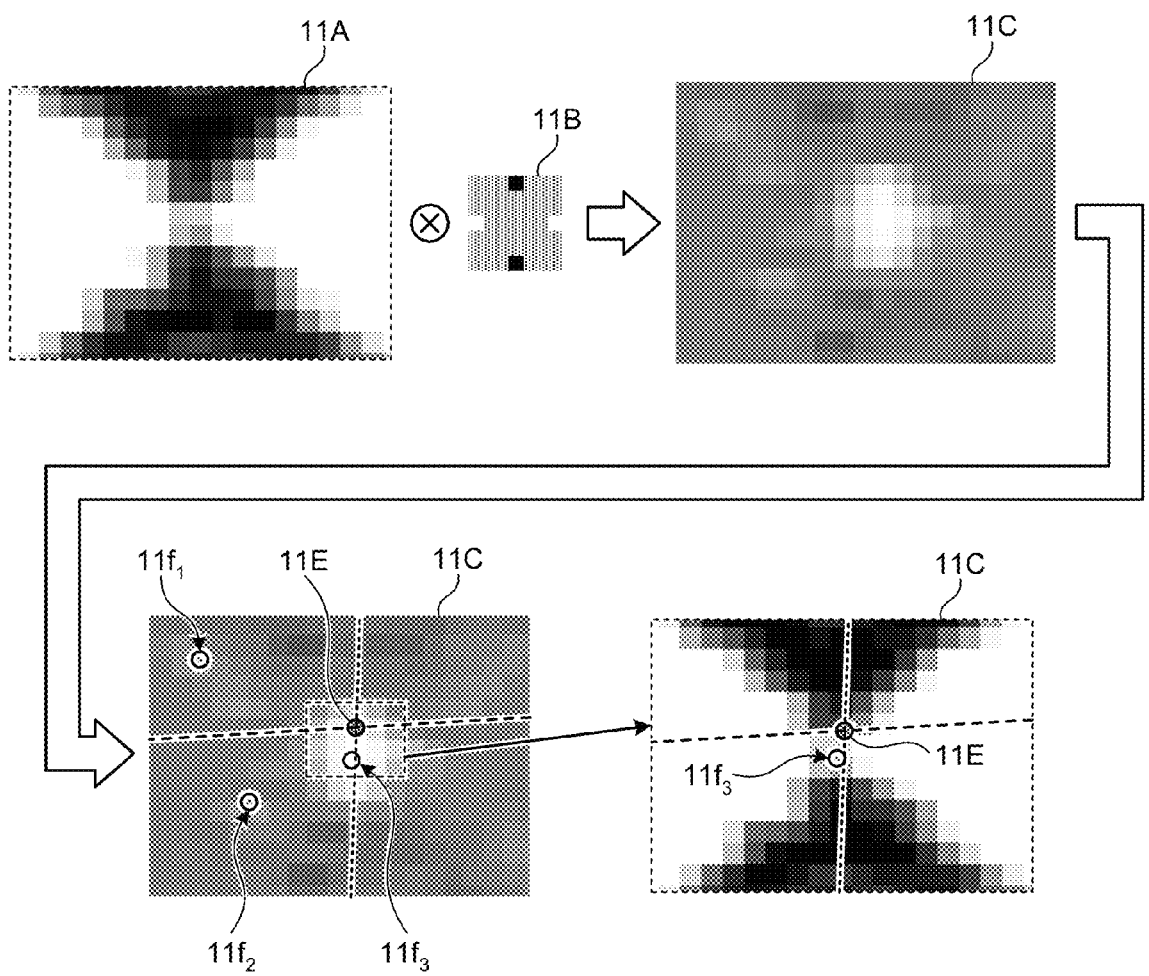
FIG. 11 is a diagram for explaining the operation of a determining unit 141F according to the first embodiment.

FIG. 11 is a diagram for explaining the operation of the determining unit 141F according to the first embodiment. 11A illustrated in FIG. 11 represents a grayscale image of the marker 3. 11B illustrated in FIG. 11 represents a cross filter. 11C illustrated in FIG. 11 represents a convolved image. $11f_1$ to $11f_3$ illustrated in FIG. 11 represent the positions of local maximum values on the convolved image. 11E illustrated in FIG. 11 represents the position of the intersection point X on the convolved image.

As illustrated in FIG. 11, after having generated the cross filter, the determining unit 141F generates the convolved image 11C convolved with the cross filter 11B with respect to each of coordinates on the grayscale image 11A of the marker 3 around the intersection point X. Incidentally, around the intersection point X corresponds, for example, to a range of about 10×10 pixels. Next, the determining unit 141F selects the local maximum value $11f_3$ closest to the position 11E of the intersection point X among the local maximum values $11f_1$ to $11f_3$ on the convolved image 11C. Then, the determining unit 141F calculates coordinates of the local maximum value $11f_3$ with sub-pixel accuracy, and outputs the calculated coordinates as final coordinates of a feature point of the marker 3 to the calculating unit 142. Incidentally, as a method of calculating coordinates of a local maximum value with sub-pixel accuracy, for example, parabola fitting can be used.

To return to FIG. 3, the calculating unit 142 calculates the position and posture of each camera 110 on the basis of the coordinates of the feature point of the marker 3 output from the determining unit 141F. When having completed the calculation of the position and posture of each camera 110, the calculating unit 142 stores information on the position and posture of each camera 110 in the position/posture storage unit 132. Incidentally, as a technology for calculating the position and posture of each camera on the basis of coordinates of a feature point of a marker on an image, for example, the technologies disclosed in Japanese Laid-open Patent Publication No. 2001-285681 and Japanese Laid-open Patent Publication No. 2008-187564 can be used.

The generating unit 143 generates a synthetic image of images acquired by the cameras 110 in response to an image output instruction or the like, and outputs the generated synthetic image. For example, upon receipt of an image output instruction via the touch panel or the like that the display 120 includes, the generating unit 143 acquires images acquired by the cameras 110 from the image storage unit 131, and also acquires the positions and postures of the cameras 110 from the position/posture storage unit 132. Then, the generating unit 143 synthesizes the images acquired by the cameras 110 thereby generating a synthetic image on the basis of the positions and postures of the cameras 110, and displays the generated synthetic image on the display 120.

Incidentally, the control unit 140 illustrated in FIG. 3 is, for example, an electronic circuit or an integrated circuit. An electronic circuit includes, for example, a CPU (Central Processing Unit) and an MPU (Micro Processing Unit). An integrated circuit includes, for example, an ASIC (Application Specific Integrated Circuit) and an FPGA (Field Programmable Gate Array), etc.

Processing by Image Processing Apparatus (First Embodiment)

The flow of processing by the image processing apparatus 100 according to the first embodiment is explained with reference to FIGS. 12 to 15. FIGS. 12 to 15 are flowcharts illustrating the flow of processing by the image processing apparatus 100 according to the first embodiment.

Position/Posture Calculating Process

Figure 12:
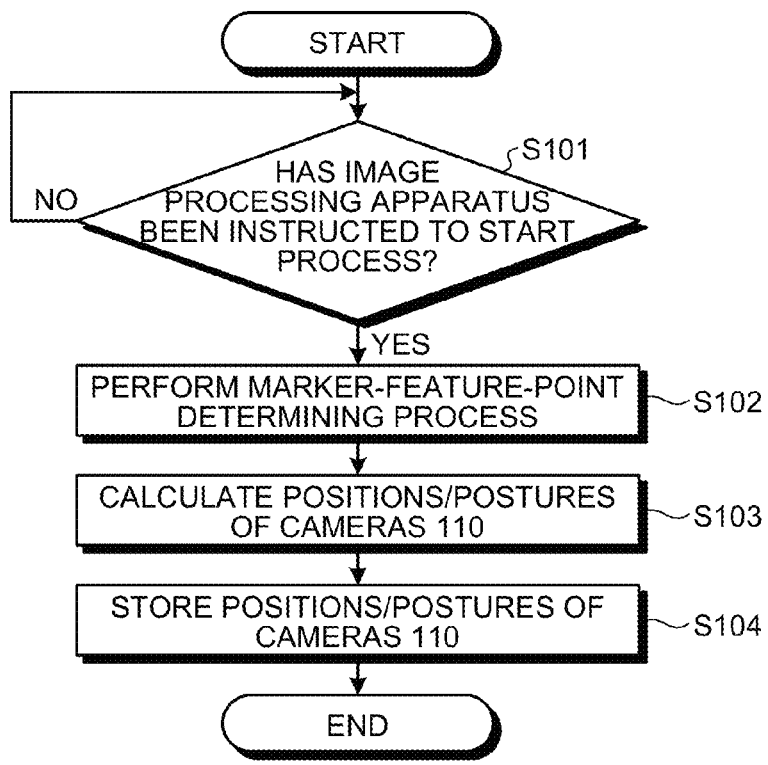
FIG. 12 is a flowchart illustrating the flow of a position/posture calculating process according to the first embodiment.

First, the flow of a position/posture calculating process is explained with reference to FIG. 12. As illustrated in FIG. 12, upon receipt of a process start instruction (YES at Step S101), the recognizing unit 141 performs a marker-feature-point determining process (Step S102). Next, the calculating unit 142 calculates the positions and postures of the cameras 110 on the basis of coordinates of a feature point of each marker 3 obtained by the marker-feature-point determining process (Step S103). Then, the calculating unit 142 stores information on the positions and postures of the cameras 110 in the position/posture storage unit 132 (Step S104), and ends the position/posture calculating process. Incidentally, until the image processing apparatus 100 has received a process start instruction, the recognizing unit 141 judges a result of the determination at the above-described Step S101 as "NO" and repeats the determination.

Image Output Process

Figure 13:
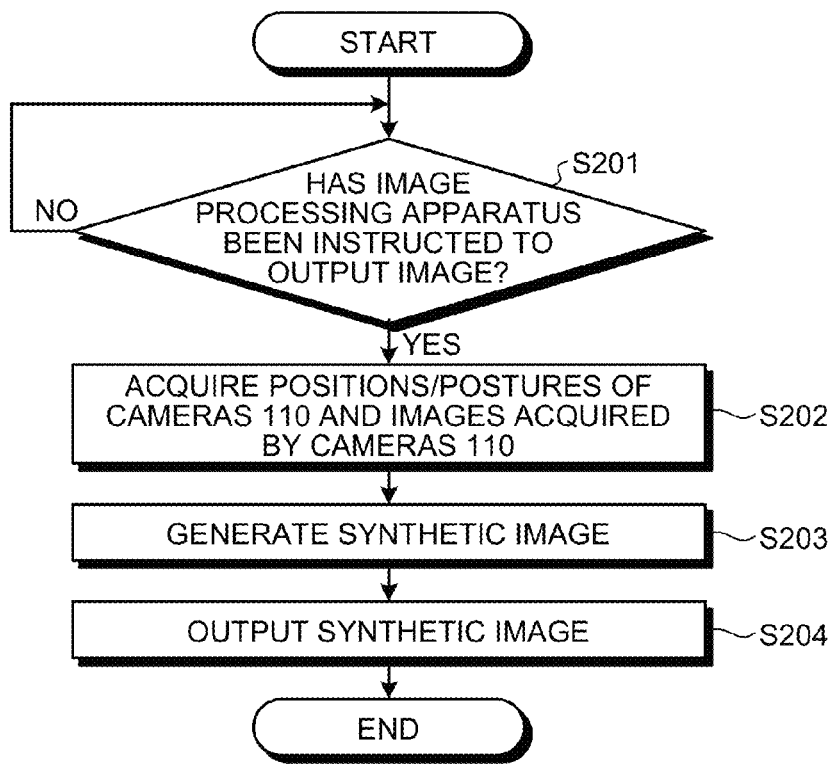
FIG. 13 is a flowchart illustrating the flow of a synthetic-image output process according to the first embodiment.

Subsequently, the flow of an image output process is explained with reference to FIG. 13. As illustrated in FIG. 13, upon receipt of an image output instruction (YES at Step S201), the generating unit 143 acquires the positions/postures of the cameras 110 and images acquired by the cameras 110 (Step S202). Next, the generating unit 143 generates a synthetic image by synthesizing the images acquired by the cameras 110 on the basis of the positions/postures of the cameras 110 (Step S203). Then, the generating unit 143 displays the synthetic image on the display 120 (Step S204), and ends the image output process. Incidentally, until the image processing apparatus 100 has received an image output instruction, the generating unit 143 judges a result of the determination at the above-described Step S201 as "NO" and repeats the determination.

Marker-Feature-Point Determining Process

Figure 14:
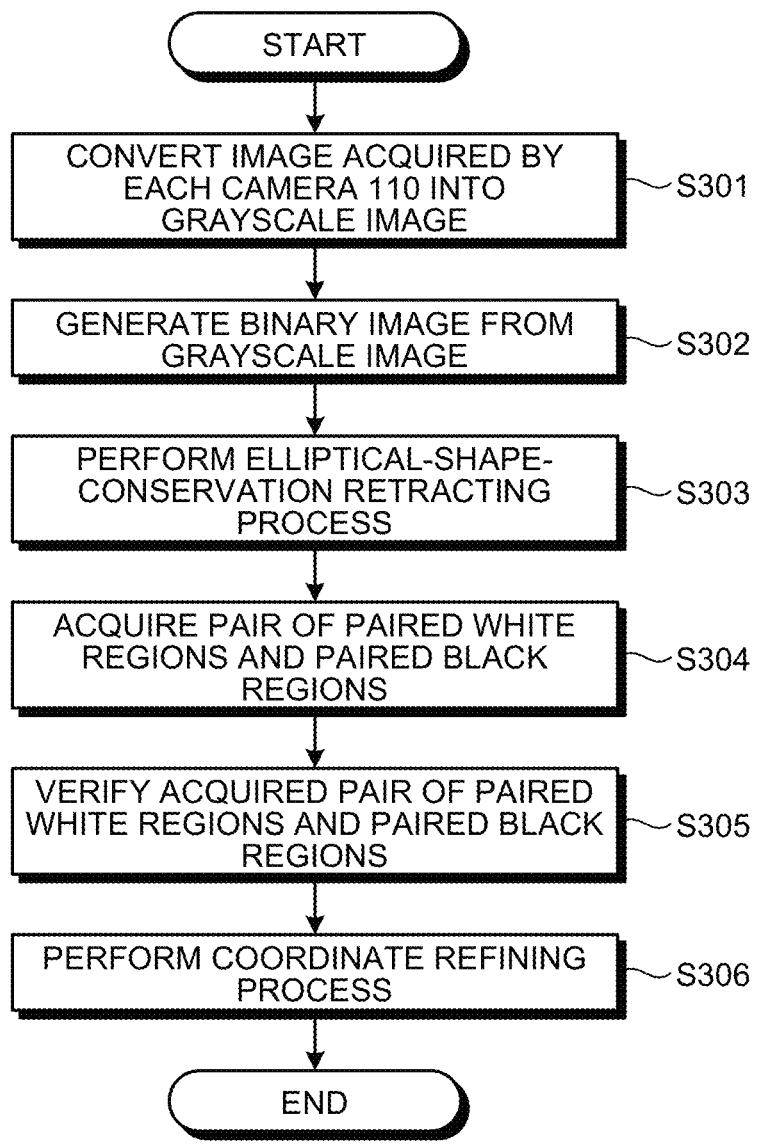
FIG. 14 is a flowchart illustrating the flow of a marker-feature-point determining process according to the first embodiment.

Subsequently, the flow of the marker-feature-point determining process is explained with reference to FIG. 14. As illustrated in FIG. 14, the converting unit 141A converts an image acquired by each camera 110 into a grayscale image (Step S301). The identifying unit 141B generates a binary image from the grayscale image (Step S302).

The retracting unit 141C performs a retracting process to retract the binary image generated by the identifying unit 141B until the shape of a binarized region in the binary image is judged as having a similarity to an elliptical shape (Step S303). The acquiring unit 141D acquires a pair of paired white regions and paired black regions meeting predetermined conditions for evaluation of the shape similarity to a marker from multiple white regions and black regions obtained by the retracting process (Step S304).

The verifying unit 141E verifies multiple pairs acquired by the acquiring unit 141D to select a pair which is most likely to be a marker 3 (Step S305). The determining unit 141F performs a coordinate refining process for refining the provisional central coordinates which is coordinates of an intersection point X acquired as the center of the marker 3 by the verifying unit 141E (Step S306), and determines coordinates of the center of the marker 3 on an image, i.e., coordinates of a feature point of the marker 3. This ends the marker-feature-point determining process.

Retracting Process

Subsequently, the flow of the retracting process is explained with reference to FIG. 15. Incidentally, the retracting process is performed on both a white region of which the value is "1" in a binary image and a black region of which the value is "0" in the binary image; however, contents of the process is the same, so the flow of the retracting process performed on a white region is explained below.

Figure 15:
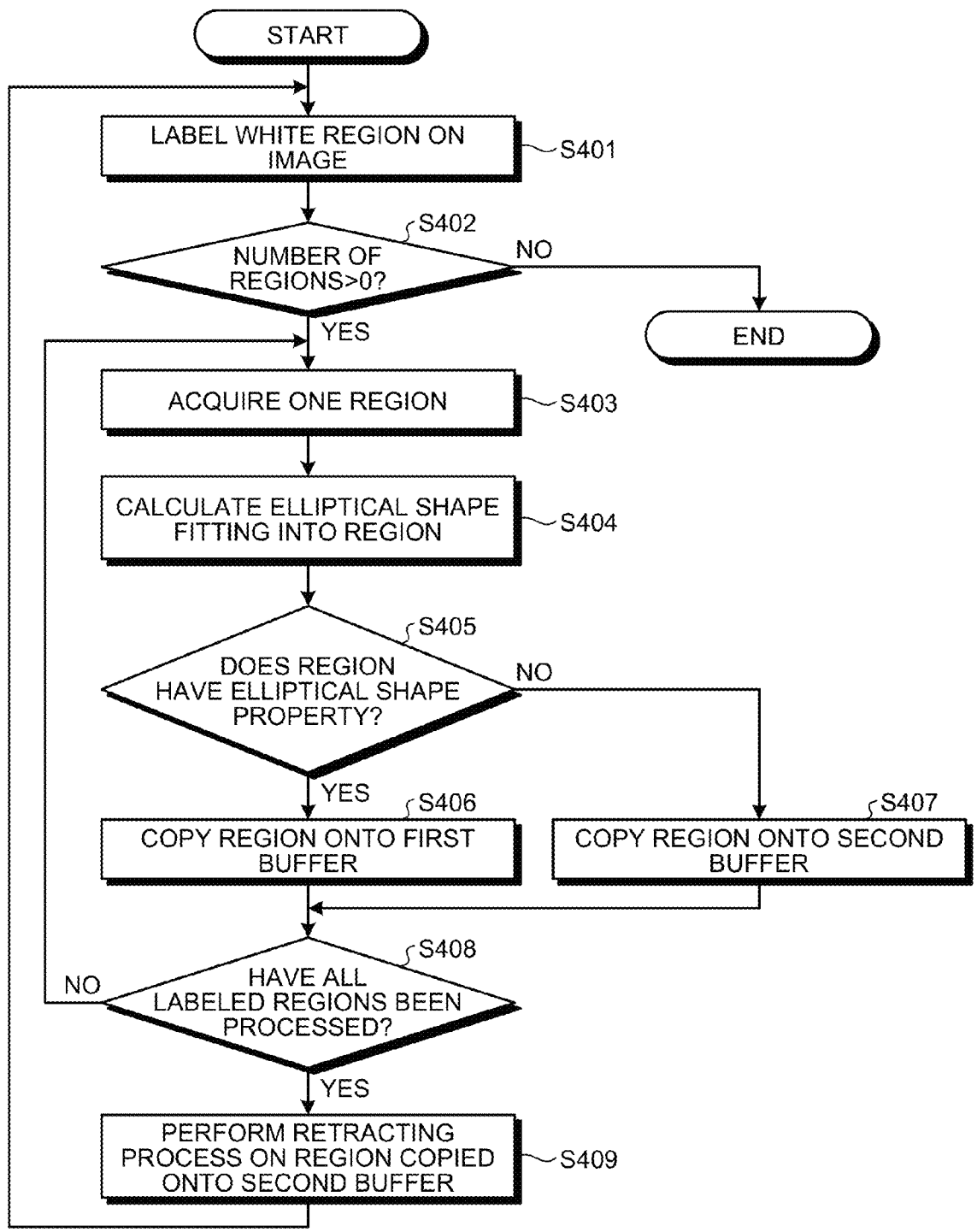
FIG. 15 is a flowchart illustrating the flow of a retracting process according to the first embodiment.

As illustrated in FIG. 15, the retracting unit 141C labels a white region of which the value is "1" in a binary image (Step S401). Next, the retracting unit 141C determines whether there is at least one white region labeled (Step S402). As a result of the determination, when there is at least one white region labeled (YES at Step S402), the retracting unit 141C acquires one labeled white region (Step S403). Then, the retracting unit 141C calculates a pseudo elliptical shape fitting into the acquired white region, i.e., most similar to the shape of the acquired white region (Step S404).

Then, the retracting unit 141C determines whether the white region acquired at Step S403 has an elliptical shape property on the basis of a ratio of an area of the white region acquired at Step S403 to an area of the pseudo ellipse calculated at Step S404 (Step S405). As a result of the determination, when the white region acquired at Step S403 has an elliptical shape property (YES at Step S405), the retracting unit 141C copies the white region onto the first buffer (Step S406). On the other hand, as a result of the determination, when the white region acquired at Step S403 has no elliptical shape property (NO at Step S405), the retracting unit 141C copies the white region onto the second buffer (Step S407).

Then, the retracting unit 141C determines whether all the labeled white regions have been subjected to the determination of whether or not to have an elliptical shape property (Step S408). As a result of the determination, when all the labeled white regions have been subjected to the determination of whether or not to have an elliptical shape property (YES at Step S408), the retracting unit 141C performs the retracting process on the white region copied onto the second buffer (Step S409). Then, return to the above-described Step S401, the retracting unit 141C labels each of the retracted white regions anew, and performs the processes at Steps S402 to S408.

Here, return back to the explanation of Step S408, as a result of the determination, when all the labeled white regions have not been subjected to the determination of whether or not to have an elliptical shape property (NO at Step S408), the retracting unit 141O returns to the above-described Step S403.

Here, return back to the explanation of Step S402, as a result of the determination, when there is no white region labeled (NO at Step S402), the retracting unit 1410 outputs the white region copied onto the first buffer to the acquiring unit 141D, and ends the elliptical-shape-conservation retracting process on the white regions in the binary image.

Incidentally, by reversing the values of the binary image and treating black regions the same as the white regions, the retracting unit 1410 performs the elliptical-shape-conservation retracting process at Steps S401 to S409 on the black regions. Then, the retracting unit 141C outputs a black region copied onto the first buffer to the acquiring unit 141D, and ends the retracting process on the black regions in the binary image.

Effects of First Embodiment

As described above, the image processing apparatus 100 repeatedly retracts a color region in an image of a checkered-patterned marker 3 until the shape of the color region is close to an elliptical shape, and determines coordinates of a feature point of the marker 3 on the basis of a positional relationship between the retracted color regions. Namely, when an image of the marker 3 is unclear, the image looks like as if a color region in a circular portion of the marker 3 and a color region outside of the circular portion of the marker 3 were connected. Therefore, in the first embodiment, with the focus on the fact that color regions in the circular portion of the marker 3 have an elliptical shape property in a state where the color regions are completely separated from the other regions in the image of the marker 3, the image processing apparatus 100 repeatedly retracts the color regions in the circular portion of the marker 3 until the color regions have an elliptical shape property. Consequently, in the first embodiment, even on an unclear image of the marker 3, color regions in the circular portion of the marker 3 can be completely separated from the other regions. We know that color regions in the circular portion of the marker 3 bear a relationship in which the color regions of the marker 3 are arranged to face each other across the center of the marker 3, so if the color regions in the circular portion of the marker 3 can be completely separated from the other regions, coordinates of the center of the marker 3 can be determined on the basis of the relationship. Consequently, according to the first embodiment, a feature point of the marker 3 can be accurately extracted even from an unclear image.

Furthermore, in the first embodiment, a pair of paired white regions and paired black regions meeting conditions for evaluation of the shape similarity to the marker 3, i.e., the above-described conditions (1) to (3) is acquired. Consequently, a pair of color regions likely to have the shape of the marker 3 can be accurately acquired from multiple color regions separated in an image of the marker 3.

Moreover, in the first embodiment, it can be configured to acquire a pair of paired white regions and paired black regions meeting the conditions (4) and (5) in addition to the above-described conditions (1) to (3). Therefore, a pair of color regions likely to have the shape of the marker 3 can be acquired more accurately than that is acquired on the basis of the conditions (1) to (3).

Furthermore, in the first embodiment, it can be configured to acquire a pair of paired white regions and paired black regions meeting at least the condition (1). Therefore, a pair of color regions likely to have the shape of the marker 3, for example, a pair of paired white regions and paired black regions can be acquired from multiple color regions separated in an image of the marker 3 more quickly than that is acquired in accordance with the multiple conditions.

Moreover, in the first embodiment, verification is performed to select a pair which is most likely to be the marker 3 from pairs of color regions likely to have the shape of the marker 3, which have been acquired in accordance with the condition(s). Consequently, a pair of color regions which is more likely to be the marker 3, for example, a pair of paired white regions and paired black regions can be identified.

Furthermore, in the first embodiment, final coordinates of the center of the marker 3, i.e., a feature point of the marker 3 is determined by refining coordinates of the center of the marker 3 acquired on the basis of a pair of color regions likely to be the marker 3. Consequently, an error between the position of the center of the marker 3 determined on the basis of the respective centroids of color regions separated on a binary image and the position of the center of the marker 3 on a grayscale image of the marker 3 can be corrected, and coordinates of the feature point of the marker 3 can be determined more accurately.

Incidentally, in the first embodiment, a point of intersection between a line connecting centroids of paired white regions and a line connecting centroids of paired black regions is acquired as the position of the center of the marker 3, and a feature point of the marker 3 is determined by refining the position of the center of the marker 3; however, it is not limited to this. For example, in a process that does not require the strict accuracy, a point of intersection between a line connecting centroids of paired white regions and a line connecting centroids of paired black regions can be determined as a feature point of the marker 3.

Incidentally, in the first embodiment, there is described a case where coordinates of a feature point of the marker 3 is determined on the basis of a positional relationship of paired white regions and paired black regions of the marker 3 on an image of the marker 3. However, it is not limited to this, and coordinates of a feature point of the marker can be determined from only a positional relationship between white regions of the marker 3 on an image of the marker 3. For example, the midpoint of a line connecting centroids of paired white regions is tentatively determined as the position of the center of the marker 3, and a feature point of the marker 3 can be determined by refining the tentatively-determined position of the center of the marker 3. This can greatly reduce the processing load for determining a feature point of the marker 3.

Incidentally, in the first embodiment, an image of the marker 3 is converted into a grayscale image, and a binary image is generated from the grayscale image; however, it is not limited to this. A binary image depending on colors of color regions of the marker 3 can be generated directly from an image of the marker 3. For example, when the marker 3 has a blue-color region and a red-color region, a binary image can be generated directly from an image of the marker 3 by using a threshold for binarizing the blue region and the red region.

[b] Second Embodiment

An image processing program and image processing apparatus according another embodiment of the present invention is explained below.

(1) Apparatus Configuration, etc.

For example, the configuration of the functional block of the image processing apparatus 100 illustrated in FIG. 3 is a conceptual configuration, and does not always have to be physically configured as illustrated in FIG. 3. For example, the converting unit 141A, the identifying unit 141B, and the retracting unit 141C illustrated in FIG. 3 can be functionally or physically integrated. In this manner, all or some of the units in the functional block of the image processing apparatus 100 can be configured to be functionally or physically divided or integrated in arbitrary units depending on respective loads and use conditions, etc.

(2) Image Processing Program

Furthermore, the various processes performed by the image processing apparatus 100 described in the above first embodiment can be realized by causing an electronic device such as a microcomputer included in an ECU (Electronic Control Unit) mounted on the vehicle 1 to execute a predetermined program.

Figure 16:
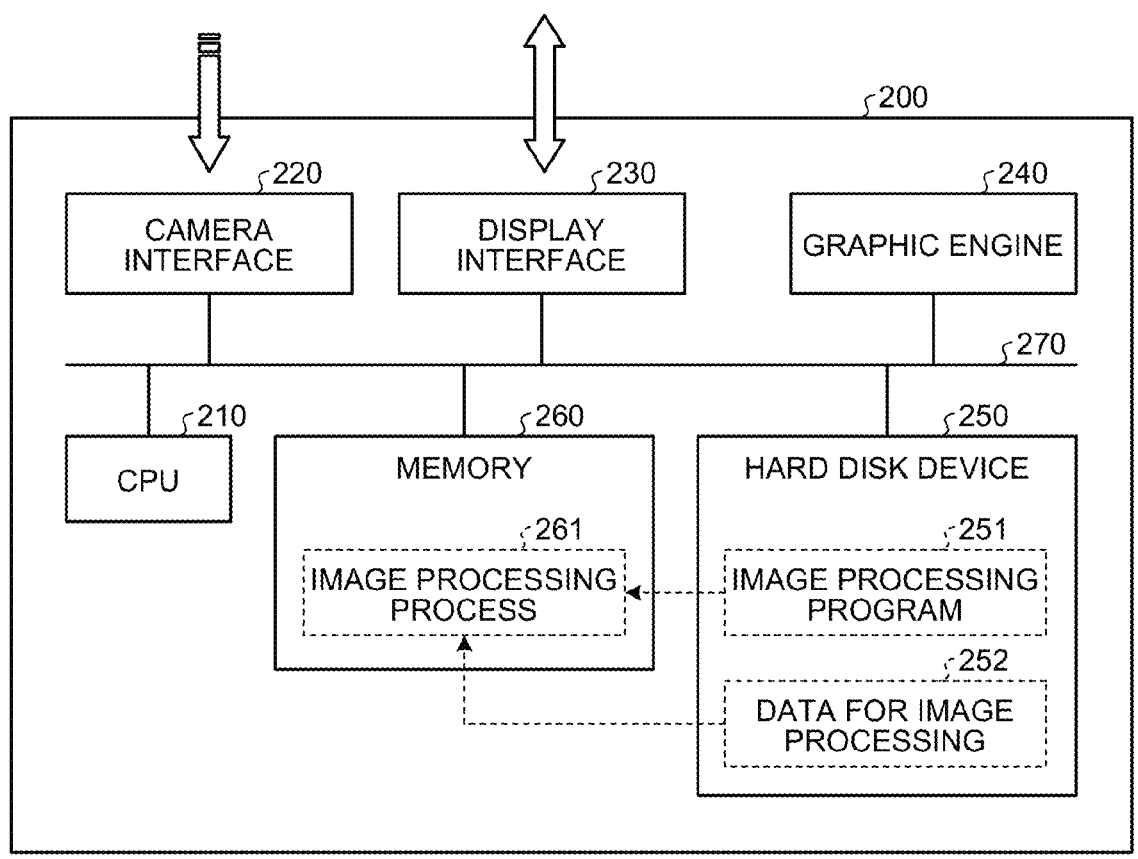
FIG. 16 is a diagram illustrating an example of an electronic device that executes an image processing program.

An example of a computer that executes an image processing program capable of realizing the same functions as the processes performed by the image processing apparatus 100 described in the above first embodiment is explained below with reference to FIG. 16. FIG. 16 is a diagram illustrating an example of an electronic device that executes the image processing program.

As illustrated in FIG. 16, an electronic device 200 that implements the various processes performed by the image processing apparatus 100 includes a CPU (Central Processing Unit) 210 that executes various arithmetic processing. Furthermore, as illustrated in FIG. 16, the electronic device 200 includes a camera interface 220 for acquiring a camera image and a display interface 230 for exchanging various data with a display. Moreover, as illustrated in FIG. 16, the electronic device 200 includes a graphic engine 240 serving as a hardware accelerator that generates a synthetic image from camera images.

Furthermore, as illustrated in FIG. 16, the electronic device 200 includes a hard disk device 250 for storing therein a program and data, etc. to be used by the CPU 210 to implement the various processes, and further includes a memory 260 such as a RAM (Random Access Memory) for temporarily storing therein various information. The devices 210 to 260 are connected to a bus 270.

Incidentally, instead of the CPU 210, for example, an electronic circuit such as an MPU (Micro Processing Unit) or an integrated circuit such as ASIC (Application Specific Integrated Circuit) and an FPGA (Field Programmable Gate Array) can be used. Furthermore, instead of the memory 260, a semiconductor memory device such as a flash memory can be used.

An image processing program 251 that fulfills the same functions as the image processing apparatus 100 and data 252 for image processing have been stored in the hard disk device 250. Incidentally, the image processing program 251 can be arbitrarily distributed and stored in a storage unit of another computer connected to the electronic device 200 via a network so that they can communicate with each other.

The CPU 210 reads out the image processing program 251 from the hard disk device 250 and expands the read image processing program 251 into the RAM 260, thereby the image processing program 251 functions as an image processing process 261 as illustrated in FIG. 16. The image processing process 261 arbitrarily expands various data, such as the data 252 for image processing, read out from the hard disk device 250 into an assigned area on the memory 260, and performs the various processes on the basis of the expanded various data.

Incidentally, the image processing process 261 includes, for example, a process performed by the control unit 140 of the image processing apparatus 100 illustrated in FIG. 3, such as the processes illustrated in FIGS. 12 to 15.

Incidentally, the image processing program 251 does not have to have been stored in the hard disk device 250 from the beginning. For example, the program has been stored in a computer-readable recording medium, such as a flexible disk (FD), a CD-ROM, a DVD, a magneto optical disk, or an IC card, capable of connecting a corresponding drive to the ECU including the electronic device 200. Then, the electronic device 200 can read out the program from the medium and execute the read program.

Furthermore, the program has been stored in "another computer (or a server)" connected to the ECU including the electronic device 200 via a public line, the Internet, a LAN, or a WAN, etc. Then, the electronic device 200 can read out the program from the computer (or the server) and execute the read program.

According to one aspect of the technology discussed in the present application, it is possible to accurately extract a feature point of a marker even from an unclear image.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein an image processing program for causing a computer to execute a process comprising:
  identifying, on a taken image of a jig having a plurality of first color regions and a plurality of second color regions different in color from the first color regions, the first color regions;
  comparing each of the identified first color regions with a predetermined convex shape and retracting each of the first color regions until it is determined that each of the first color regions has a similarity in shape to the predetermined convex shape; and
  determining a feature point of the jig on the image on the basis of a positional relationship of a plurality of first retracted regions on the image, the first retracted regions being obtained from the first color regions as a result of retraction at the retracting, wherein
  the identifying includes comparing each of pixel values of pixels composing a grayscale image with a predetermined threshold, binarizing a pixel of which the pixel value is larger than the predetermined threshold to "1", binarizing a pixel of which the pixel value is equal to or smaller than the predetermined threshold to "0", generating a binary image from the grayscale image, and identifying white regions as the first color regions and black regions as the second color regions on the grayscale image, and
  the retracting includes performing a retracting process to repeatedly retract each of color regions in the binary image generated at the identifying until the shape of a binarized region in the binary image is judged as having a similarity to a predetermined elliptical shape, separating the white regions in a circular portion of the jig from the white regions outside of the circular portion of the jig, and separating the black regions in the circular portion of the jig from the black regions outside of the circular portion of the jig.

2. The non-transitory computer-readable recording medium according to claim 1, wherein
  the identifying includes identifying the first color regions and the second color regions on the image,
  the retracting includes comparing each of the first and second color regions identified at the identifying with the predetermined convex shape and retracting each of the first and second color regions until it is determined that each of the first and second color regions has a similarity in shape to the predetermined convex shape, and
  the determining includes determining the feature point of the jig on the image on the basis of the positional relationship of the first retracted regions on the image and a positional relationship of a plurality of second retracted regions on the image, the second retracted regions being obtained from the second color regions as a result of retraction at the retracting.

3. The non-transitory computer-readable recording medium according to claim 2, wherein the process further comprises
  judging whether a first line connecting predetermined points in the first retracted regions on the image intersects with a second line connecting predetermined points in the second retracted regions on the image;
  acquiring a combination of paired first retracted regions forming the first line and paired second retracted regions forming the second line when the first line intersects with the second line; and
  calculating an evaluation value for evaluating the possibility of being the jig with respect to each of combinations acquired at the acquiring and verifying whether the calculated evaluation value is equal to or more than a predetermined value, and wherein
  the determining includes finding a point of intersection between the first line and the second line with respect to the combination of which the evaluation value is evaluated as equal to or more than the predetermined value at the verifying and determining the feature point on the basis of the point of intersection.

4. The non-transitory computer-readable recording medium according to claim 3, wherein the acquiring includes, when the first line intersects with the second line, judging whether a distance between a midpoint of the first line and a midpoint of the second line is equal to or less than a predetermined value, and, when the distance between the midpoint of the first line and the midpoint of the second line is equal to or less than the predetermined value, acquiring the combination of the paired first retracted regions and the paired second retracted regions.

5. The non-transitory computer-readable recording medium according to claim 4, wherein
the acquiring includes, when the distance between the midpoint of the first line and the midpoint of the second line is equal to or less than the predetermined value, judging whether an angle between the first line and the second line is equal to or more than a predetermined value, and, when the angle between the first line and the second line is equal to or more than the predetermined value, acquiring the combination of the paired first retracted regions and the paired second retracted regions.

6. The non-transitory computer-readable recording medium according to claim 3, wherein the process further comprises
generating a cross filter on the basis of the first line and the second line with respect to the combination of which the evaluation value is evaluated as equal to or more than the predetermined value at the verifying, and wherein
the determining includes generating a convolved image convolved with the cross filter with respect to each of coordinates of an input image of the jig around the point of intersection, acquiring a coordinate corresponding to a local maximum value closest to the point of intersection among coordinates corresponding to local maximum values in the generated convolved image, and determining the acquired coordinate of the local maximum value as a coordinate of the feature point.

7. The non-transitory computer-readable recording medium according to claim 1, wherein the process further comprises
calculating a mounting position or angle of a camera that takes the image of the jig using a coordinate of the determined feature point.

8. An image processing apparatus comprising:

a memory; and a processor coupled to the memory, wherein the processor executes a process comprising:

identifying, on a taken image of a jig having a plurality of first color regions and a plurality of second color regions different in color from the first color regions, the first color regions;

comparing each of the identified first color regions with a predetermined convex shape and retracting each of the first color regions until it is determined that each of the first color regions has a similarity in shape to the predetermined convex shape; and determining a feature point of the jig on the image on the basis of a positional relationship of a plurality of first retracted regions on the image, the first retracted regions being obtained from the first color regions as a result of retraction at the retracting, wherein the identifying includes comparing each of pixel values of pixels composing a grayscale image with a predetermined threshold, binarizing a pixel of which the pixel value is larger than the predetermined threshold to "1", binarizing a pixel of which the pixel value is equal to or smaller than the predetermined threshold to "0", generating a binary image from the grayscale image, and identifying white regions as the first color regions and black regions as the second color regions on the grayscale image and the retracting includes performing a retracting process to repeatedly retract each of color regions in the binary image generated at the identifying until the shape of a binarized region in the binary image is judged as having a similarity to a predetermined elliptical shape, separating the white regions in a circular portion of the jig from the white regions outside of the circular portion of the jig, and separating the black regions in the circular portion of the jig from the black regions outside of the circular portion of the jig.

* * * * *